United States Patent [19]

Riggi

[11] Patent Number: 5,063,877
[45] Date of Patent: Nov. 12, 1991

[54] BIRD FEEDER APPARATUS

[76] Inventor: Michael S. Riggi, 39 Parkhaven Dr., Tonawanda, N.Y. 14150

[21] Appl. No.: 644,279

[22] Filed: Jan. 22, 1991

[51] Int. Cl.$^5$ ............................................. A01K 39/00
[52] U.S. Cl. .................................. 119/52.2; D30/124
[58] Field of Search ........................... 119/52.2, 57.8; D30/124–128

[56] References Cited

U.S. PATENT DOCUMENTS

| | | | |
|---|---|---|---|
| 2,475,207 | 7/1949 | Smith | D30/124 |
| 4,318,364 | 3/1982 | Bescherer | 119/57.8 |
| 4,892,060 | 1/1990 | Lundquist | 119/52.2 |
| 4,966,098 | 10/1990 | Freeman | 119/52.2 |

Primary Examiner—John G. Weiss
Attorney, Agent, or Firm—Leon Gilden

[57] ABSTRACT

An apparatus including a container defined by a planar floor and side walls, with a bell-shaped housing overlying the floor, wherein the housing is spaced above the floor by projecting legs extending downwardly from the housing. The body of the housing is thereby defined by a lower terminal edge spaced above the floor of the container. The housing includes a neck portion mounting a funnel member overlying the neck portion to provide deflection of rain and intruding animals from seed positioned within the container. Rod-like perch members are provided directed through the wall of the container and the housing.

4 Claims, 5 Drawing Sheets

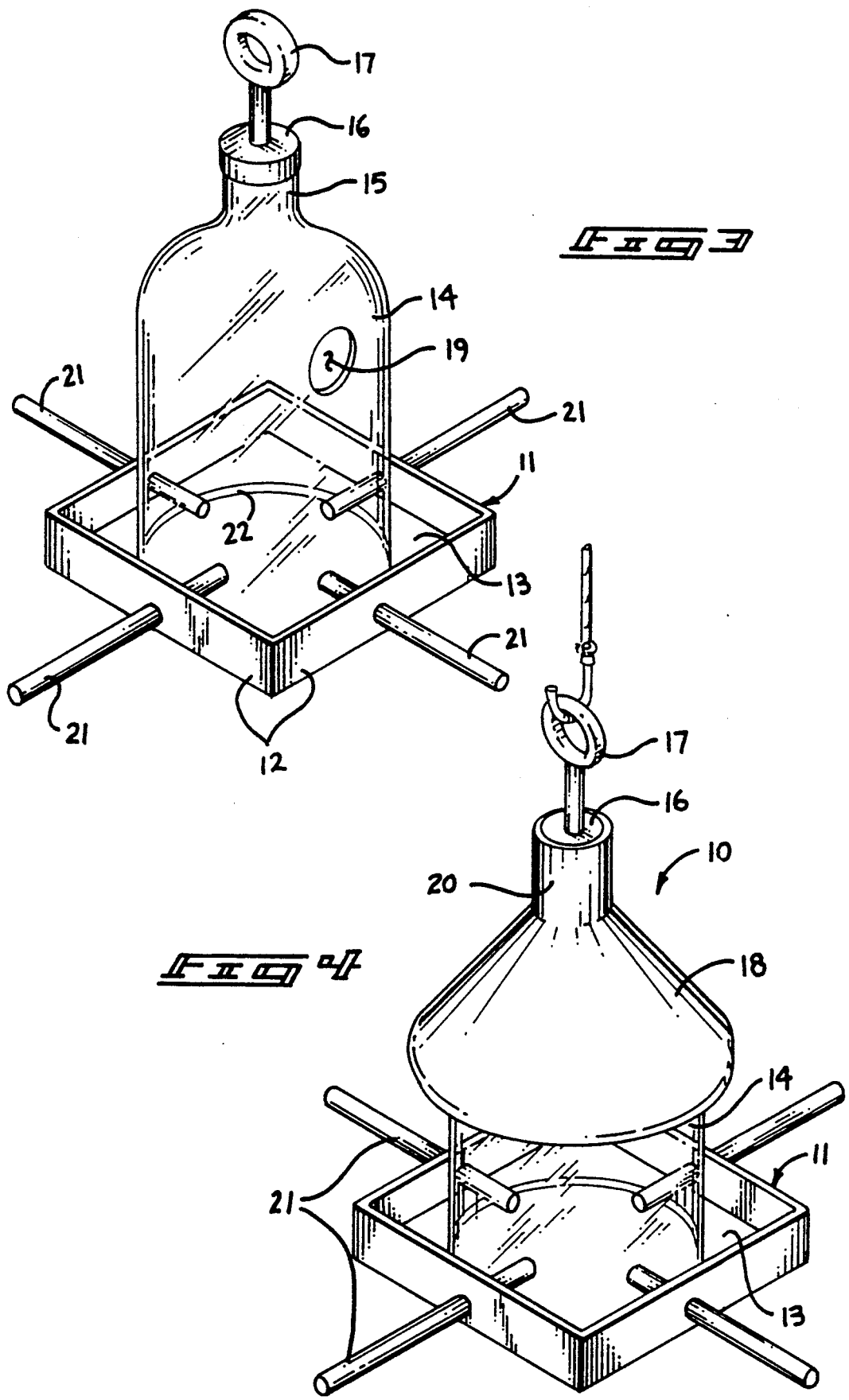

BIRD FEEDER APPARATUS

BACKGROUND OF THE INVENTION

1. Field of the Invention

The field of invention relates to bird feeder apparatus, and more particularly pertains to a new and improved bird feeder apparatus wherein the same provides a planar floor and a bell-shaped housing overlying the floor with legs extending the housing above the floor, and rain and animal deflectors to protect the seed.

2. Description of the Prior Art

Bird feeder apparatus of various types have been well known in the prior art to provide continuous replenishment of bird feed for the feeding of various birds and the like. Examples of prior art structure may be found in U.S. Pat. No. 4,246,869 to Tobin Jr. wherein a bird feeder utilizes an elongate housing formed with various apertures therethrough for permitting birds to have access to the feed within the housing.

U.S. Pat. No. 3,040,705 to Schlitz sets forth a bird feeder wherein an inverted jar utilizes an apertured lid to direct feed to an underlying surface.

U.S. Pat. No. 2,277,420 to Stanfield provides for a feed organization for the feeding of poultry and stock, wherein the feeder provides for housing spaced above a floor to direct feed to an underlying floor surface.

U.S. Pat. No. 4,215,652 to Kerscher provides for a bird feeder utilizing a "V" shaped hopper, including apertures to permit access of birds to the feed contained within the hopper.

As such, it may be appreciated that there continues to be a need for a new and improved bird feeder apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of bird feeder apparatus now present in the prior art, the present invention provides a bird feeder apparatus wherein the same provides for an automatic replenishment of bird feed within an underlying container surface of a structure, and further provides modified structure for effecting agitation of the bird feeder within the hopper. As such, the general purpose of the present invention, which will be described subsequently in greater detail, is to provide a new and improved bird feeder apparatus which has all the advantages of the prior art bird feeder apparatus and none of the disadvantages.

To attain this, the present invention provides an apparatus including a container defined by a planar floor and side walls, with a bell-shaped housing overlying the floor, wherein the housing is spaced above the floor by projecting legs extending downwardly from the housing. The body of the housing is thereby defined by a lower terminal edge spaced above the floor of the container. The housing includes a neck portion mounting a funnel member overlying the neck portion to provide deflection of rain and intruding animals from seed positioned within the container. Rod-like perch members are provided directed through the wall of the container and the housing.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved bird feeder apparatus which has all the advantages of the prior art bird feeder apparatus and none of the disadvantages.

It is another object of the present invention to provide a new and improved bird feeder apparatus which may be easily and efficiently manufactured and marketed.

It is a further object of the present invention to provide a new and improved bird feeder apparatus which is of a durable and reliable construction.

An even further object of the present invention is to provide a new and improved bird feeder apparatus which is susceptible of a low cost of manufacture with regard to both materials and labor, and which accordingly is then susceptible of low prices of sale to the consuming public, thereby making such bird feeder apparatus economically available to the buying public.

Still yet another object of the present invention is to provide a new and improved bird feeder apparatus which provides in the apparatuses and methods of the prior art some of the advantages thereof, while simultaneously overcoming some of the disadvantages normally associated therewith.

Still another object of the present invention is to provide a new and improved bird feeder apparatus wherein the same provides an automatic replenishment of bird feed within an underlying container for access to birds.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of the instant invention with an associated funnel member removed therefrom.

FIG. 4 is an isometric illustration of the instant invention of the instant invention in an assembled configuration.

DESCRIPTION OF THE PREFERRED EMBODIMENT

Figure 1:
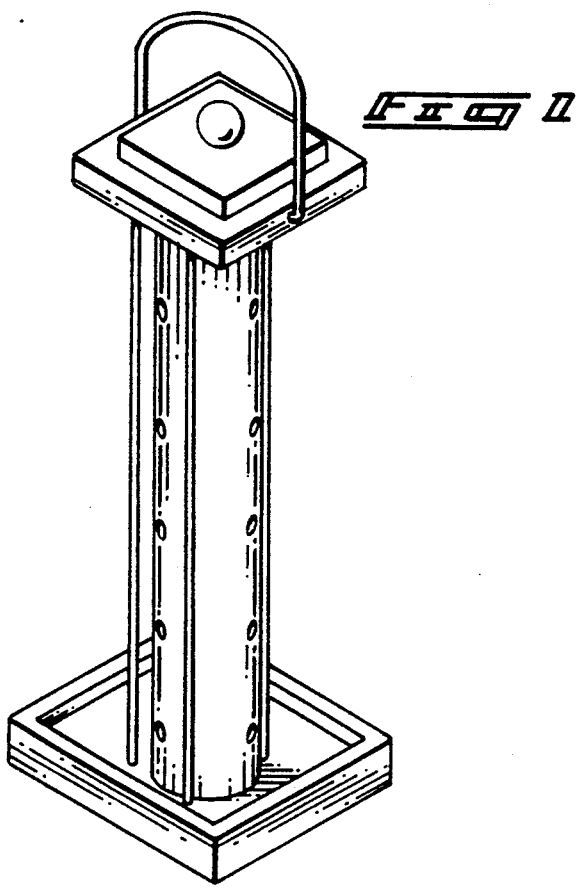
FIG. 1 is an isometric illustration of a prior art bird feeder apparatus.

With reference now to the drawings, and in particular to FIGS. 1 to 10 thereof, a new and improved bird feeder apparatus embodying the principles and concepts of the present invention and generally designated by the reference numeral 10 will be described.

FIG. 1 illustrates a prior art bird feeder apparatus 1, wherein a central hopper utilizes various apertures therethrough to permit access of birds to seed contained within the hopper through the apertures, as set forth in U.S. Pat. No. 4,246,869.

Figure 2:
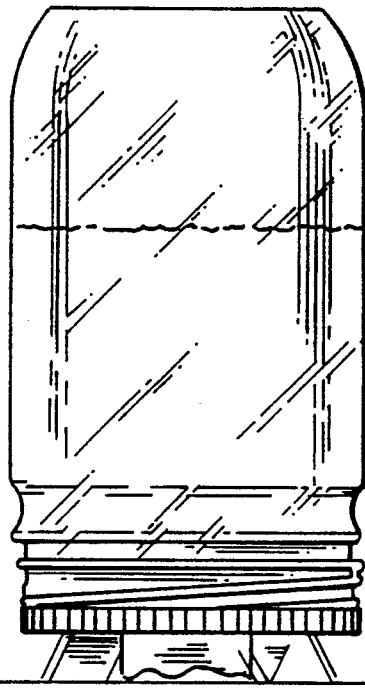
FIG. 2 is an orthographic side view, taken in elevation, of a prior art bird feeder apparatus.
Figure 5:
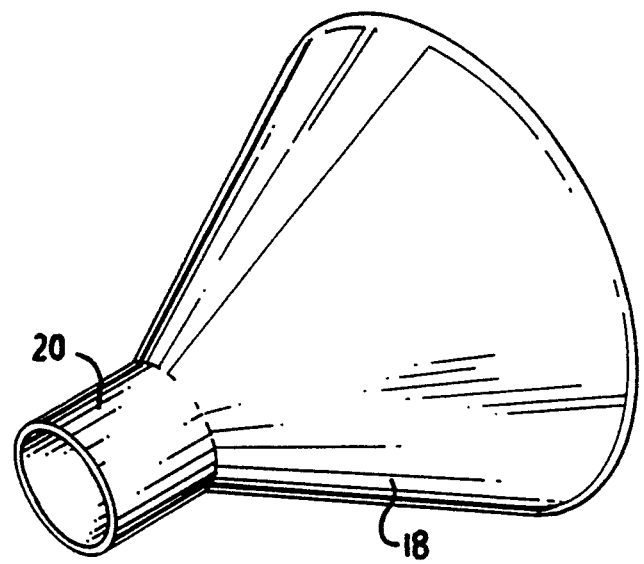
FIG. 5 is an isometric illustration of the funnel utilized by the instant invention.
Figure 6:
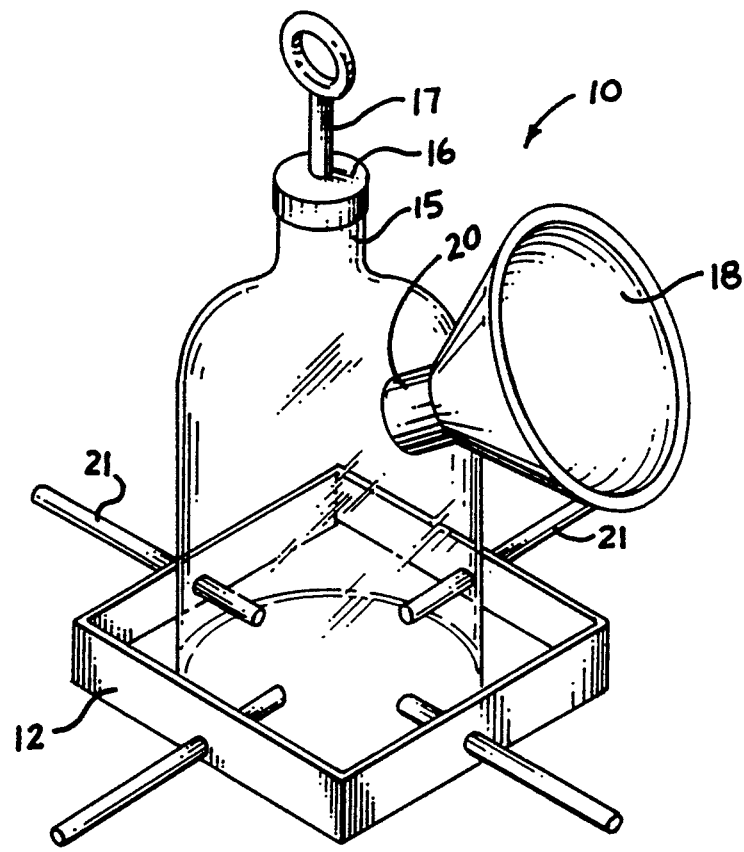
FIG. 6 is an isometric illustration of the funnel utilized in replenishment of the hopper of the instant invention.
Figure 7:
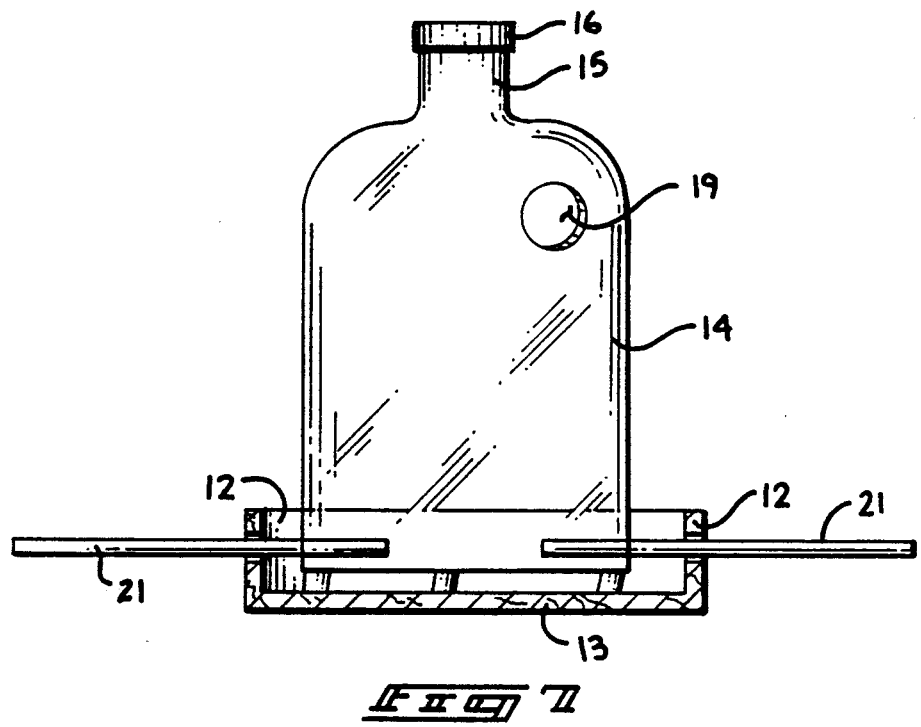
FIG. 7 is an orthographic side view of the instant invention.

FIG. 2 illustrates a further prior art bird feeder apparatus 2, wherein, as described in U.S. Pat. No. 3,040,705, a bird feeder is defined by an inverted jar, wherein the jar includes an apertured lid and plate members extending downwardly from the lid to direct seed to a support surface underlying the jar.

More specifically, the bird feeder apparatus 10 of the instant invention essentially comprises an underlying container 11, including side walls 12 fixedly mounted to an underlying floor 13. The side walls 12 define a generally square configuration of a predetermined height. A transparent housing 14 defining a hopper is mounted with its access orthogonally oriented relative to the floor 13. The hopper is formed of a transparent cylindrical body whose lower terminal edge 14a (see FIG. 10) is spaced above the floor 13 by foot members 22 that extend downwardly from the lower terminal edge 14a. It should be noted that the spacing of the lower terminal edge 14a above the floor 13 is less than the predetermined height. The hopper 14 includes a neck defined by a second diameter less than the first diameter defined by the cylindrical body of the hopper, wherein the neck fixedly mounts a cap 16 thereon. Removably mounted overlying the cap is a funnel 18. Further as illustrated, the cap fixedly and orthogonally mounts a support loop 17, wherein the support loop, the cap, and the neck are each defined by substantially the second diameter. The funnel 18 includes a conical body, with a funnel neck 20 defined by an internal diameter substantially equal to the first diameter to overlie the neck and cylindrical body in an inverted configuration, as illustrated, to provide a climate shield when thusly mounted. The funnel 18 is accordingly removable and positionable within a fill aperture 19 that is directed through the cylindrical body of the hopper 14. The funnel accordingly is defined by an external diameter substantially equal to a predetermined diameter of the aperture to permit positioning of the funnel within the aperture for replenishment of bird seed and the like within the hopper.

Each of the side walls 12 includes a perch rod 21 directed therethrough and directed radially into the hopper 14 cylindrical body adjacent the lower terminal edge 14a.

Figure 8:
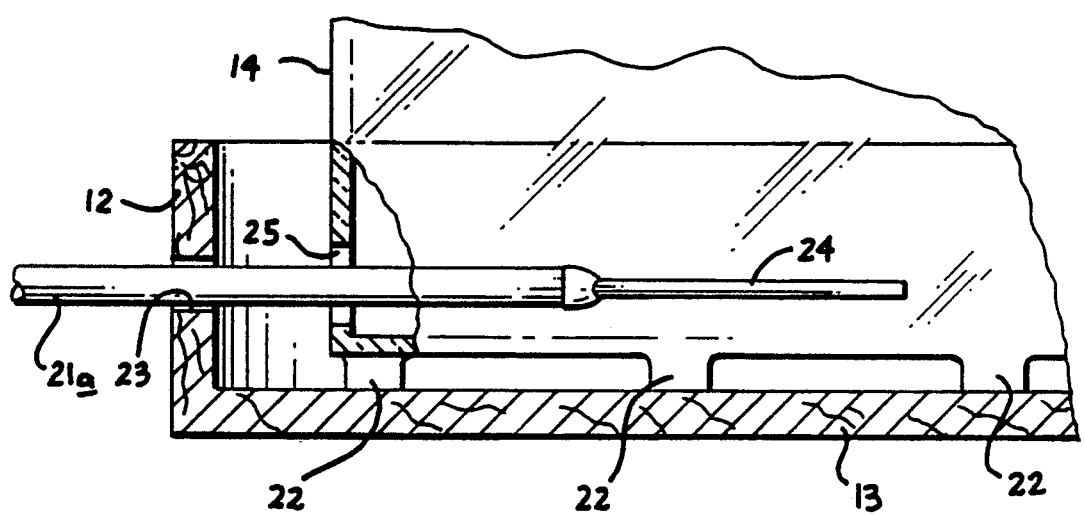
FIG. 8 is an orthographic side view, partially in section, of a modified rod structure utilized in agitation of bird feed within the hopper structure.
Figure 9:
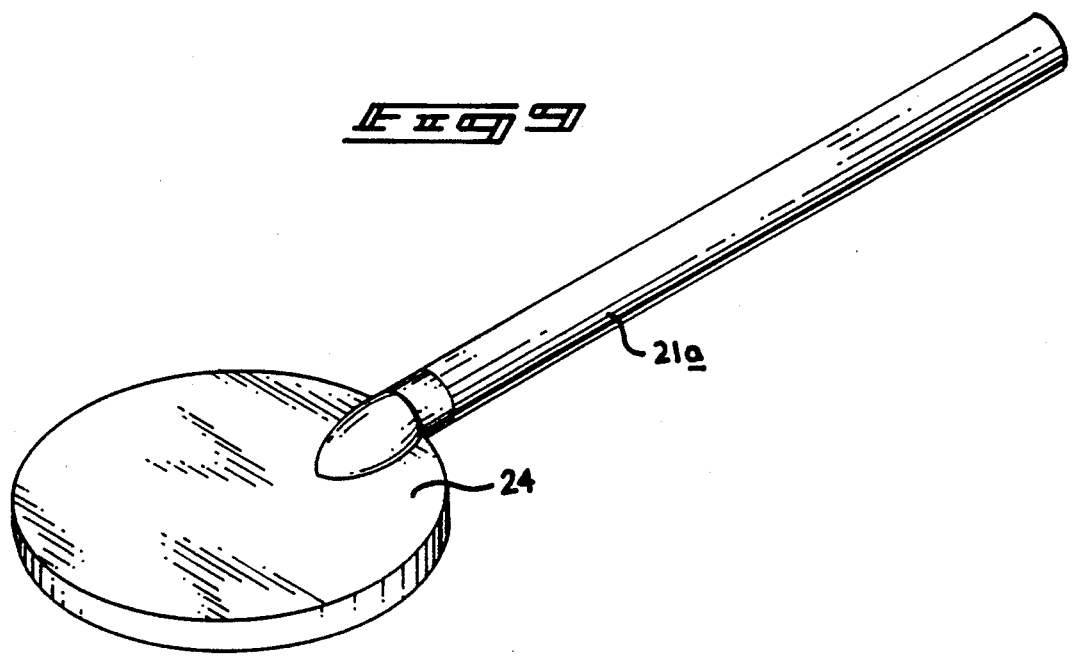
FIG. 9 is an isometric illustration, somewhat enlarged, of the modified perch member utilized by the instant invention.
Figure 10:
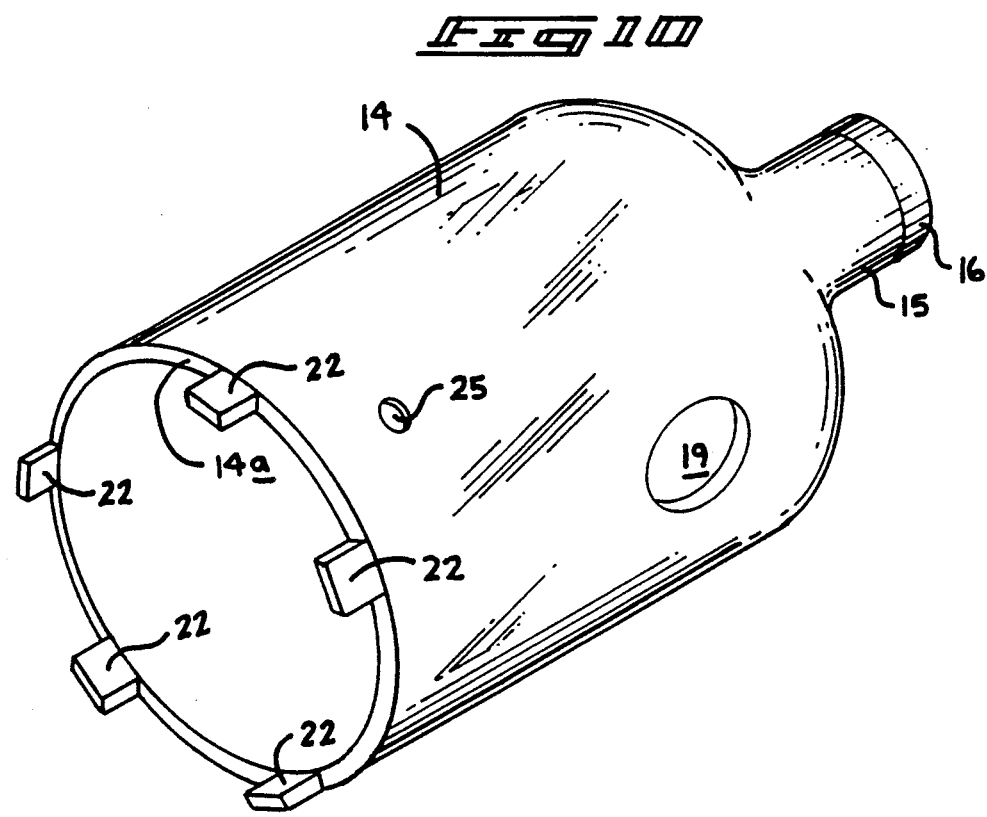
FIG. 10 is an isometric illustration of the hopper structure utilized by the instant invention.

FIGS. 8 and 9 illustrates the use of a modified perch rod construction 21, wherein each modified perch rod is directed through an associated wall opening 23 defined by an opening diameter greater than a perch diameter defined by each perch rod to permit relative pivotment of the perch rod when a bird alights upon the perch rod 21a. The perch rod extends through a jar body bore 25 defined by a bore diameter greater than the perch rod diameter, wherein an enlarged planar paddle 24 is mounted to an interior terminal end of the perch rod, whereupon a bird alighting upon the perch rod 21a effects agitation of bird seed within the hopper 14 to minimize blockage of feeding the hopper due to bird feed adhering relative to one another and prevent uniform distribution of the seed from the hopper into the container 11.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A bird feeder apparatus comprising, in combination, a container, the container including an elongate floor and a continuous wall mounted to the floor in surrounding relationship relative to the floor, wherein the continuous wall includes a plurality of planar wall members defining a square configuration, and a hopper defined about a central axis, wherein the central axis is orthogonally oriented relative to the floor and positioned medially relative to the floor, and the hopper includes a cylindrical body defined by a lower terminal edge, the lower terminal edge spaced above the floor, and the hopper includes a neck portion, the neck portion defined by a second diameter, wherein the cylindrical body is defined by a first diameter, and wherein the second diameter is less than the first diameter, and a cap member mounted to a terminal end of the neck orthogonally oriented relative to the hopper access, and a support loop mounted on the cap, and wherein the neck, the cap, and the support loop are each equal to the second diameter, and a fill aperture directed through the cylindrical body defined by a predetermined diameter, and a funnel, wherein the funnel includes a conical body and funnel neck, and the conical body is positioned overlying the cylindrical body in a first position, wherein the first position the funnel neck is positioned in surrounding relationship relative to the neck.

2. An apparatus as set forth in claim 1 wherein the funnel neck includes an external diameter equal to the predetermined diameter of the fill aperture to permit positioning of the funnel neck within the fill aperture in a second position removed from the first position, and the funnel neck is defined by an internal diameter equal to the first diameter to permit reception of the neck and cap within the funnel neck.

3. An apparatus as set forth in claim 2 wherein each wall section of the continuous wall includes a perch rod directed therethrough, and each perch rod is radially directed into the cylindrical body adjacent the hopper lower terminal edge.

4. An apparatus as set forth in claim 3 wherein each perch rod is defined by a perch rod diameter, and each wall section includes a wall opening receiving a respective perch rod therethrough, and each wall opening is defined by an opening diameter greater than the perch rod diameter to permit pivoting of the perch rod within the wall opening, and the cylindrical body includes a jar body bore oriented for each perch rod of each wall section to receive the perch rod therethrough, wherein each jar body bore is defined by a bore diameter greater than the perch rod diameter, and each perch rod includes an interior terminal end positioned interiorly of the hopper and each interior terminal end includes an enlarged planar paddle fixedly mounted on the interior terminal end and the planar paddle is longitudinally aligned relative to the perch rod to permit agitation of bird seed contained within the hopper upon a bird alighting on the perch rod exteriorly of each wall section.

* * * * *